(12) United States Patent
Weber

(10) Patent No.: US 11,006,777 B1
(45) Date of Patent: May 18, 2021

(54) TAMPER FOR ESPRESSO MACHINE

(71) Applicant: Douglas Weber, Itoshima (JP)

(72) Inventor: Douglas Weber, Itoshima (JP)

( * ) Notice: Subject to any disclaimer, the term of this patent is extended or adjusted under 35 U.S.C. 154(b) by 0 days.

(21) Appl. No.: 16/919,088

(22) Filed: Jul. 1, 2020

(51) Int. Cl.
*A47J 31/06* (2006.01)
*A47J 31/52* (2006.01)

(52) U.S. Cl.
CPC ....... *A47J 31/0663* (2013.01); *A47J 31/5251* (2018.08)

(58) Field of Classification Search
CPC .............. A47J 31/44; A47J 43/28; A23L 1/00
USPC .................. 99/275, 280; 156/73.1, 580.1
See application file for complete search history.

(56) References Cited

U.S. PATENT DOCUMENTS

2005/0132890 A1* 6/2005 Constantine ............ A47J 31/44
99/275
2014/0248581 A1* 9/2014 Petersen ................. A61C 3/166
433/119
2017/0367537 A1* 12/2017 Illy .......................... A47J 42/50
2019/0307401 A1* 10/2019 Miyoshi ................ A61B 5/6843

FOREIGN PATENT DOCUMENTS

KR  10-1171108  * 8/2012
KR  10-1756121  * 7/2017

* cited by examiner

*Primary Examiner* — Thien S Tran
(74) *Attorney, Agent, or Firm* — Klein, O'Neill & Singh, LLP

(57) ABSTRACT

A tamping device is disclosed herein which measures a tamp force applied to ground coffee in a portafilter and provides feedback to the user when a desired tamp force has been achieved so that the user can stop the tamping step when preparing the portafilter to brew espresso. The tamping device may also have a plurality of force sensors, which measure how even the user applied force is being applied to the ground coffee in the portafilter so that a density of the ground coffee is even throughout the compressed ground coffee formed by tamping the ground coffee.

10 Claims, 8 Drawing Sheets

US 11,006,777 B1

TAMPER FOR ESPRESSO MACHINE

CROSS-REFERENCE TO RELATED APPLICATIONS

Not Applicable

STATEMENT RE: FEDERALLY SPONSORED RESEARCH/DEVELOPMENT

Not Applicable

BACKGROUND

The various aspects and embodiments described herein relate to an espresso tamper for compressing ground coffee (i.e., compressed ground coffee) in a basket of a portafilter when brewing espresso.

Espresso is prepared by extracting coffee from ground coffee beans. The ground coffee beans are compressed into a basket of a portafilter. If the ground coffee is not compressed evenly in the basket of the portafilter to a particular density throughout the basket of the portafilter, the water forced through the compressed ground coffee may flow through a channel (i.e., path of lower resistance) and avoid higher density areas (i.e., path of higher resistance). Put simply, the water will not flow evenly throughout the compressed ground coffee in the basket of the portafilter. Because of this, the extracted coffee may extract more coffee out of the ground coffee adjacent where the channeling occurs and less coffee out of the ground coffee in other areas. Due to channeling, coffee may be unevenly extracted from the compressed ground coffee and may pull unwanted compounds from the ground coffee. The unwanted compounds from the ground coffee may unacceptably alter the flavor profile of the extracted espresso.

As such, a need in the art exists for helping users to compress ground coffee in a basket to better control the extraction process when brewing espresso.

BRIEF SUMMARY

A tamping device, including a force sensor and vibrator, is disclosed herein. The force sensor senses a level of tamp force being applied to ground coffee in a basket of a portafilter. When the applied tamp force sensed by the force sensor is equal to a desired tamp force, the tamping device alerts the user that the desired tamp force has been achieved. For example, a processor in the tamping device may activate the vibrator to notify the user that the desired tamp force has been achieved. The processor may activate the vibrator in the following ways: a vibration intensity of the vibrator may be lowered, increased, turned off, turned on or actuated in a pattern to notify the user that the desired tamp force has been achieved. Additionally, the tamping device may have a plurality of force sensors to measure whether the tamping device is being pressed evenly across an upper surface of the ground coffee in the basket of the portafilter. The even application of pressure facilitates an even density of ground coffee in the basket of the portafilter, which is beneficial when brewing espresso.

More particularly, a tamper for an espresso machine is disclosed. The tamper may comprise a head, a handle, a force sensor, and a vibrator. The head may have a disc shape and an engagement surface. The head may have an outer diameter between 40 to 60 mm. The engagement surface of the head may be flat or convex. The handle may be attached to the head for manipulating the head to apply a tamp force to ground coffee disposed in a portafilter. The force sensor may be attached to the head to sense the tamp force applied to the ground coffee disposed in the portafilter. The vibrator may be attached to the head for transferring vibration from the head to the ground coffee.

The tamper may further comprising a processor with instructions loaded thereon to perform the following steps of receiving a signal from the force sensor; and activating the vibrator when the force sensor senses a first level of force based on a received signal from the force sensor.

The tamper may further comprising a processor with instructions loaded thereon to perform the following steps of activating the vibrator; and changing a vibration intensity of the vibrator based on a received signal from the force sensor.

The force sensor may be a strain gage, a load cell, force-sensitive resistor sold under the tradename FLEXI-FORCE, load pins, extensometers, torque sensors, piezoresistive-based force sensor, diaphragm pressure sensors or other force sensing mechanism.

The tamper may further comprise a plurality of force sensors. The force sensors may be positioned about a periphery of the head of the tamper to measure the evenness of the user applied force onto the ground coffee via the head.

The tamper may further comprise first, second, third, and fourth force sensors. Each of the force sensors may be located 90 degrees apart from each other about a central axis of the head for measuring an evenness of the user applied force onto the ground coffee via the head.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
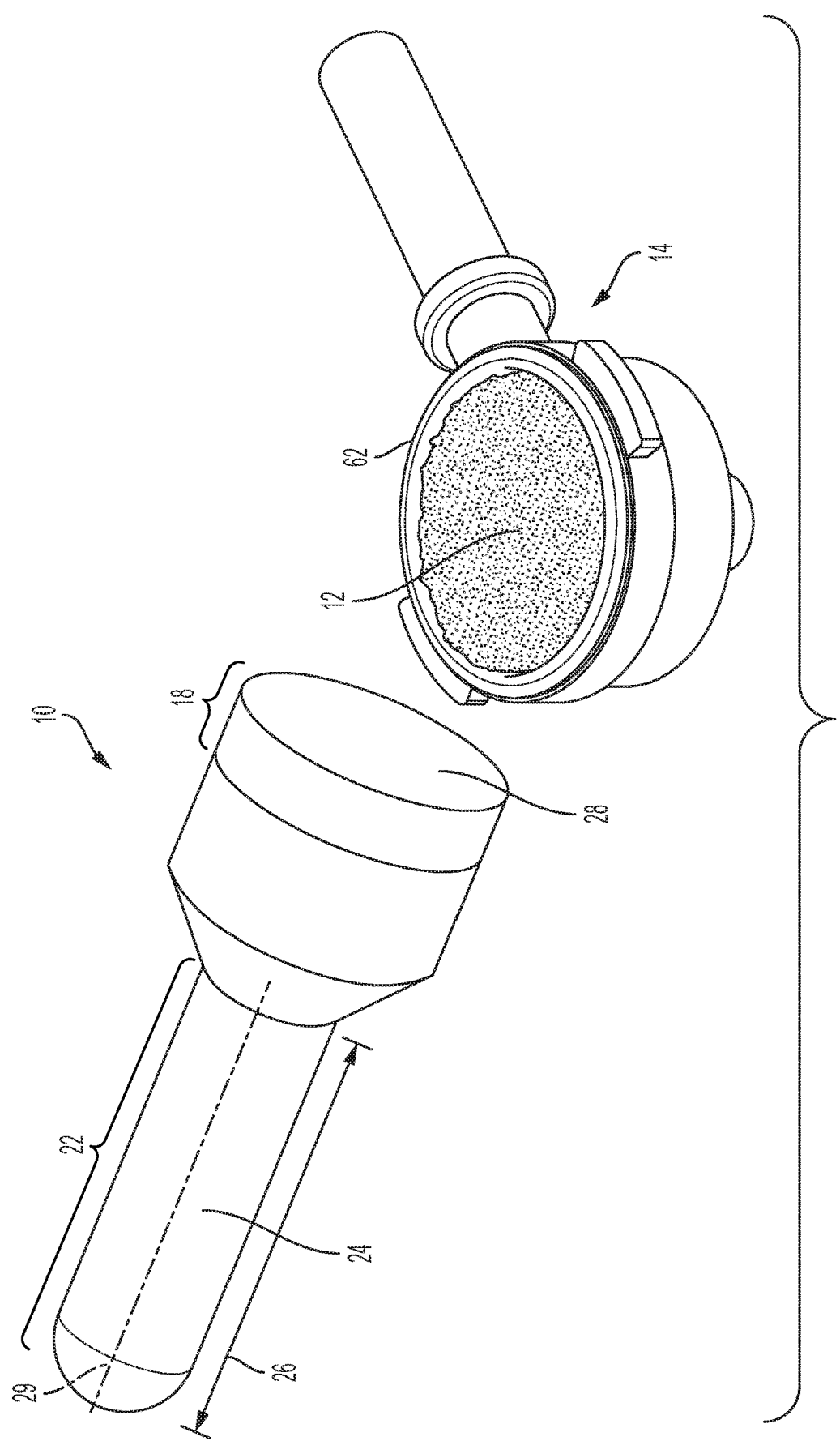
FIG. 1 illustrates a perspective view of a tamping device and portafilter with ground coffee leveled off evenly before tamping.

Referring now to the drawings, a tamping device 10 is shown. The tamping device 10 may have a feedback mechanism to help a user (e.g., barista) compress ground coffee to a desired tamp force and evenly in a basket of a portafilter when brewing espresso. The tamping device 10 may have a force sensor 20 to help the user apply the desired tamp force when compressing the ground coffee in the basket of the portafilter. Also, the tamping device may help the user apply even pressure on the ground coffee 12 disposed in the portafilter 14 by utilizing a plurality of force sensors. The plurality of force sensors 20 senses when the user is pushing into the ground coffee unevenly. The feedback mechanism of the tamping device 10 may be a vibrator 16 (see FIG. 3). Moreover, the vibrator can also facilitate vibration of the ground coffee and remove voids in the compressed ground coffee to prevent channeling in the compressed ground coffee during the brewing or extraction process.

Referring now to FIG. 1, the tamping device 10 may have a handle 22 and a head 18. The handle 22 may be sized and configured to be gripable by an adult hand. The handle 22 may be ambidextrous. Moreover, an exterior surface 24 of the handle 22 may have various textures including but not limited to smooth, rough, tacky or combinations thereof. The handle 22 may be sized and configured so that a user may grip the handle 22 and apply a downward force onto the ground coffee disposed in the portafilter 14. By way of example and not limitation, a length 26 of the handle 22 may be about 3 to 7 inches long and is preferably about 5 inches long. The head 18 may have a distal end surface 28. An outer diameter of the head 18 may be between 40 mm to 60 mm or any other diameter so as to match an inner diameter of the basket of the portafilter. The distal end surface 28 of the head 18 may be flat. Additionally, a central longitudinal axis 29 disposed at the center of the handle 22 may be perpendicular to the exterior surface 28. This helps to facilitate the application of even pressure to the ground coffee 12 in the portafilter 14. It helps the user to better visualize whether he or she is applying even pressure onto the ground coffee. Although the distal end surface 28 is shown as being flat, it is also contemplated that the distal end surface 28 may have other configurations such as convex or concave.

Figure 2:
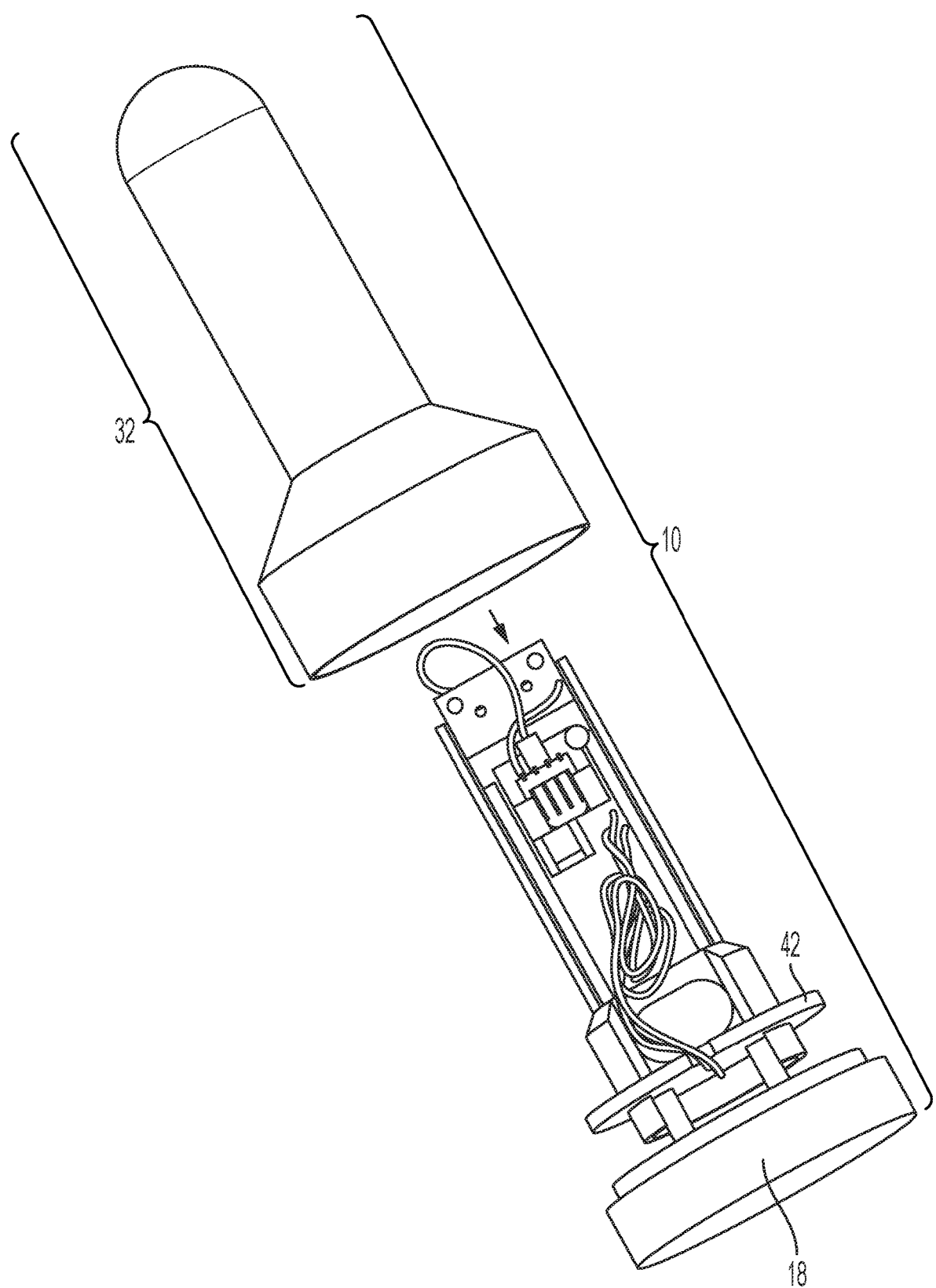
FIG. 2 illustrates an exploded perspective view of the tamping device.
Figure 3:
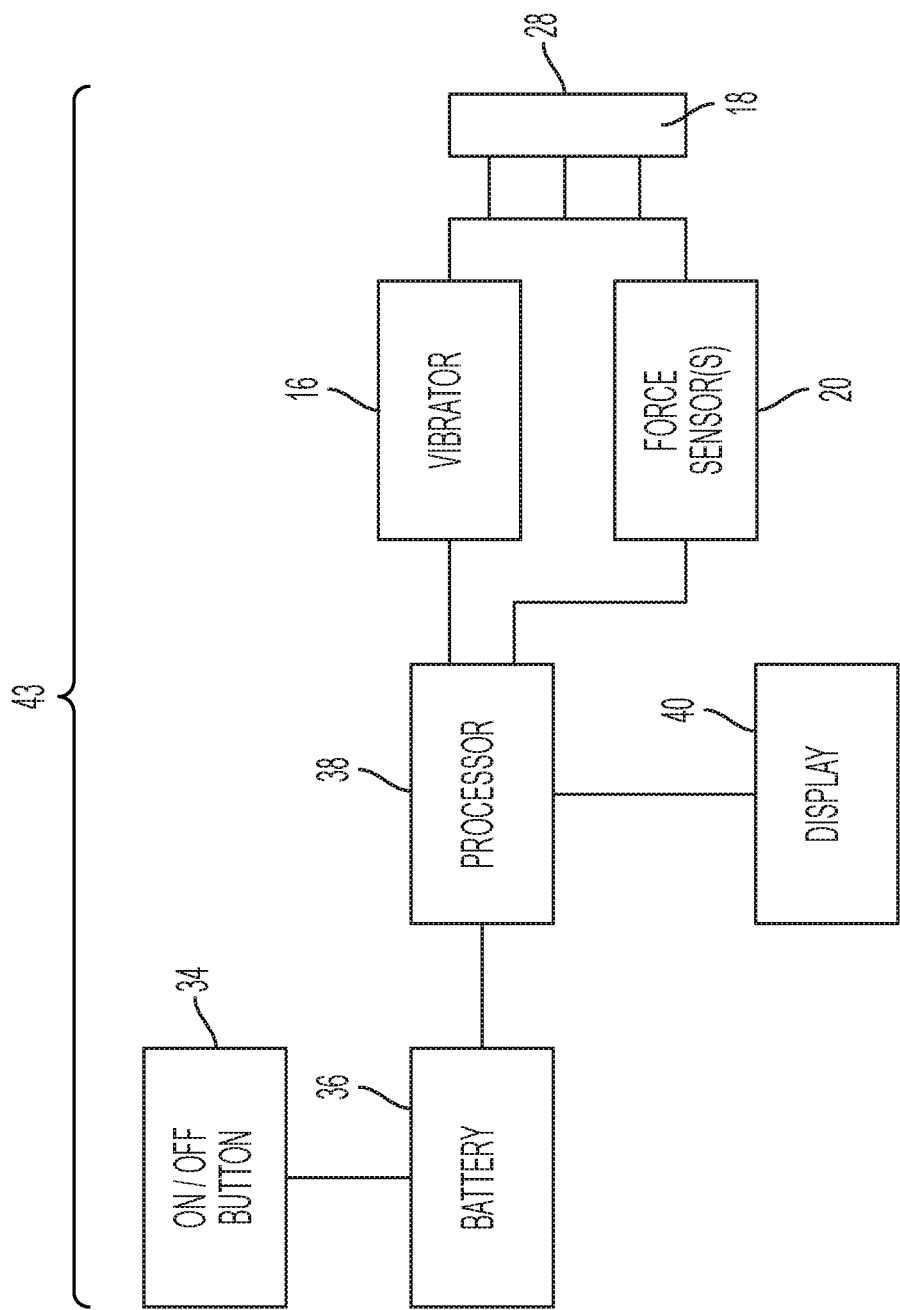
FIG. 3 illustrates an electronic schematic of the tamping device.

Referring now to FIG. 2, the handle 22 may have a housing 32. The housing 32 may house, as shown in FIG. 3, an on-off button 34, a battery 36, a processor 38, the vibrator 16, a display 40 and the force sensor(s) 20. The housing 32 may be removably engageable to a frame 42. The frame 42 holds the electronics 43 shown in FIG. 3 as well as the head 18.

The on-off button 34 turns the electronics shown in FIG. 3 on or off. When the button is on, the battery 36 powers the processor 38, vibrator 16, display 40 and/or the force sensor 20. When the button is in the off position, the battery does not provide any power to any of the electronics 43 of the tamping device 10.

Figure 4:
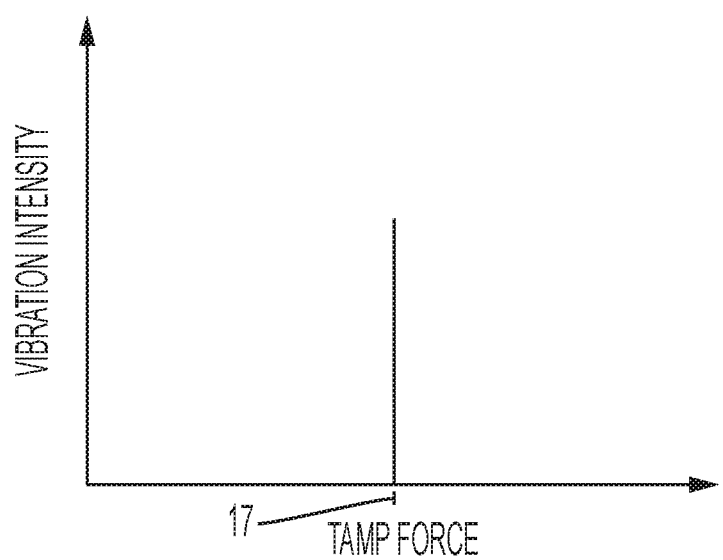
FIG. 4 illustrates a first mode of operation of the tamping device.

When the button 34 is initially traversed to the on-position from the off position, the tamping device may be placed into a first mode. The first mode of operation is shown in FIG. 4. During operation of the tamping device 10, the user may place the head 18 of the tamping device into the portafilter 14. The user may press the head into the portafilter 14 by gripping and pushing the handle 22 of the tamping device 10. As the user pushes the head 18 of the tamping device into the portafilter 14, the force sensor 20 measures the force being applied to the ground coffee 12 in the portafilter. In the first mode, the vibrator 16 is not vibrating and is initially off. The user may continue to increase the pressure or force being applied to the ground coffee until he or she applies the desired tamp force 17 (e.g., 30 lbs) onto the ground coffee 12 in the basket of the portafilter. By way of example and not limitation, the desired tamp force may be between 3 pounds and 50 pounds. Preferably, the desired tamp force being applied onto the ground coffee 12 in the basket of the portafilter 14 is about 30 pounds. In this regard, when the user applies pressure onto the ground coffee 12 via the tamping device 10, the force sensor 20 senses the amount of force being applied to the ground coffee 12. When the force sensor senses the desired tamp force (e.g., 30 pounds), the vibrator 16 may be activated by the processor so that the user feels a vibration in his or her hand. This indicates that the desired tamp force onto the ground coffee 12 has been achieved. The user may release pressure and remove the head 18 out of the portafilter 14. When pressure is released, the vibrator may then turned off so that the user does not feel any vibration. The vibrator notifies the user when the desired tamp force has been achieved. In this way, the ground coffee is compressed with the desired tamp force.

Figure 5:
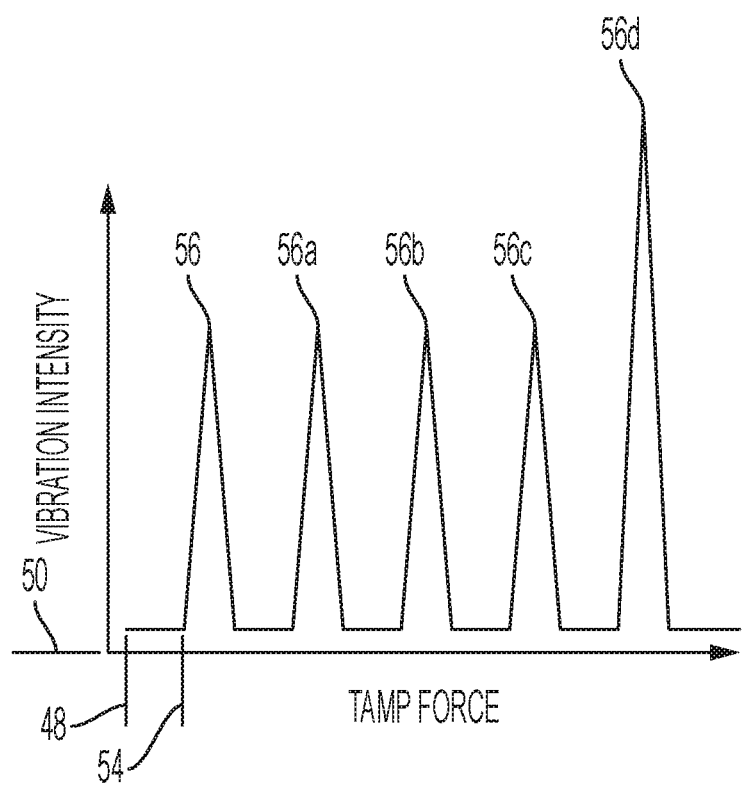
FIG. 5 illustrates a second mode of operation of the tamping device.

Referring now to FIG. 5, a second mode of operation is shown. When the tamping device 10 is initially turned on, it may enter the first mode by default. In order to transition the tamping device 10 between various modes, the tamping device may have a selector switch which allows the user to position the switch in various positions to change the mode of the tamping device 10. Alternatively or additionally, the display 40 may be a touch screen display and may allow the user to touch the display 40 in order to switch between modes of the tamping device 10.

In the second mode, the tamping device 10 initially is not vibrating. The vibrator 16 is off and not vibrating. However, when a slight force (e.g., tamp force 48) is applied to the ground coffee in the portafilter 14, the force sensor(s) 20 may sense pressure. When the force sensor 20 senses a slight pressure, the processor 38 may turn the vibrator 16 on at a first vibration intensity level 50. As the user pushes further downward onto the ground coffee 12, the force sensor 20 senses that more force is being applied to the ground coffee. Nevertheless, the vibration intensity level remains at the same level as before. When the force sensed by the force sensor is equal to a second level 54, the vibration from the vibrator 16 begins to increase and will sharply increase until it peaks at vibration intensity level 56. The vibration intensity level 56 is significantly higher than the vibration intensity level 50 so that the user can sense a change in vibration intensity levels. As the user continues to increase the tamp force, the vibration intensity level will sharply decrease. At peak 56, the tamp force is at a predefined level (e.g., 5 lbs). As the user continues to increase the tamp force, the vibration intensity level will sharply increase and sharply decrease multiple times to provide biofeedback to the user to indicate to the user the level of tamp force being applied to the ground coffee 12. Peak 56*a* may indicate that the tamp force has reached 10 lbs. Peak 56*b* may indicate that the tamp force has reached 15 lbs. Peak 56*c* may indicate that the tamp force has reached 20 lbs. Peak 56*d* may indicate that the tamp force has reached 25 lbs. Moreover, peak 56*d* indicates that the vibrator 16 vibrates at a higher intensity compared to peaks 56-56*c*, which indicates to the user that the desired force has been achieved, which in this case is 25 lbs.

Figure 6:
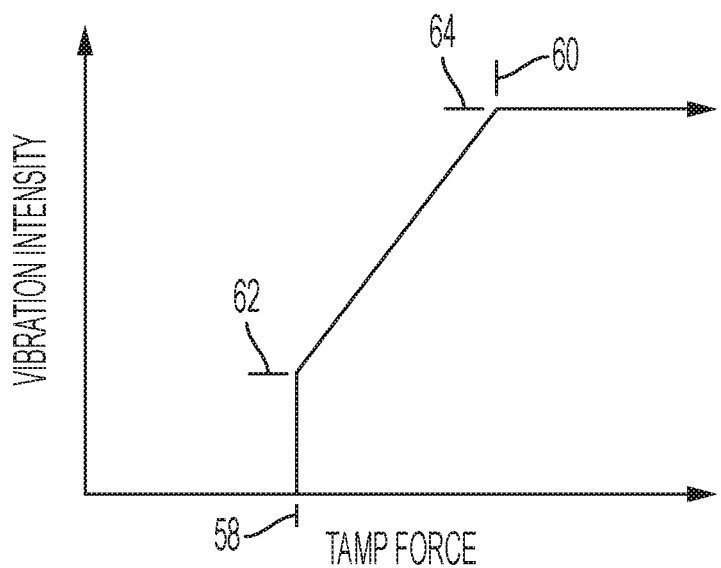
FIG. 6 illustrates a third mode of operation of the tamping device.

Referring now to FIG. 6, a third mode of operation is shown. In the third mode, the vibrator is turned off and does not vibrate until a significant level of force is sensed by the force sensor 20. By way of example and not limitation, the vibrator 16 may remain off and not produce any vibration until the force sensor 20 senses more than 3 lbs to 20 lbs of force. More particularly, the vibrator 16 may remain off until a base tamp force 58 is sensed by the force sensor 20. The base tamp force 58 is lower than the desired tamp force 60.

By way of example and not limitation, the base tamp force 58 may be at least 3 lbs and no more than 20 lbs of tamp force. More particularly, the base tamp force 58 maybe 7 pounds. The user may initially compress the ground coffee in the portafilter with the base 44 of the tamping device 10 until the base tamp force 58 is achieved. At that time, the processor may turn the vibrator 16 on to provide vibration at vibration intensity 62. After the base tamp force 58 is applied to the ground coffee, the user may continue to press into the ground coffee until the desired tamp force 60 is achieved. As the tamp force increases, the vibration intensity increases until the vibration intensity reaches point 64. The vibration intensity increases are shown as being linear. However, the rate of vibration increases may be curved. When the desired tamp force 60 is sensed by the force sensor 20, the processor may control the vibrator 16 to provide a consistent level of vibration intensity despite any further increase in sensed pressure by the force sensor. The user may release pressure by removing the base 44 of the tamping device 10 from the basket of the portafilter.

Figure 7:
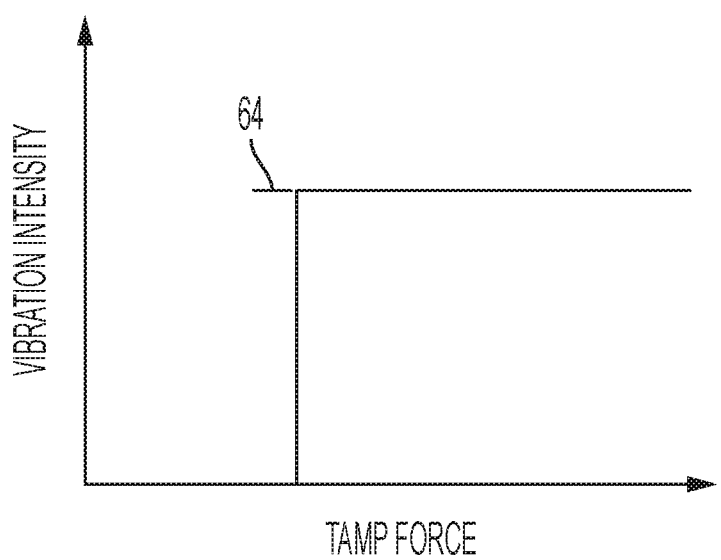
FIG. 7 illustrates a fourth mode of operation of the tamping device.

Referring now to FIG. 7, a fourth mode of operation is shown. In the fourth mode, the tamping device 10 operates identically to the third mode except that after the base tamp force 58 is sensed by the force sensor 20, the vibration intensity is increased to the vibration intensity 64. Moreover, as the user continues to press into the portafilter, which increases the tamp force on the ground coffee, the vibration intensity does not increase or decrease, the vibration intensity remains the same until the user removes the base 44 of the tamping device from the portafilter.

The biofeedback mechanism (e.g., vibration or light) discussed herein to notify the user when the desired tamp force has been achieved may be replaced with or used in conjunction with the display, which may display the current tamp force. The user knows when the desired tamp force has been achieved by merely reading the display. Also, the display can be programmed to change colors when the desired tamp force has been achieved.

Figure 8A:
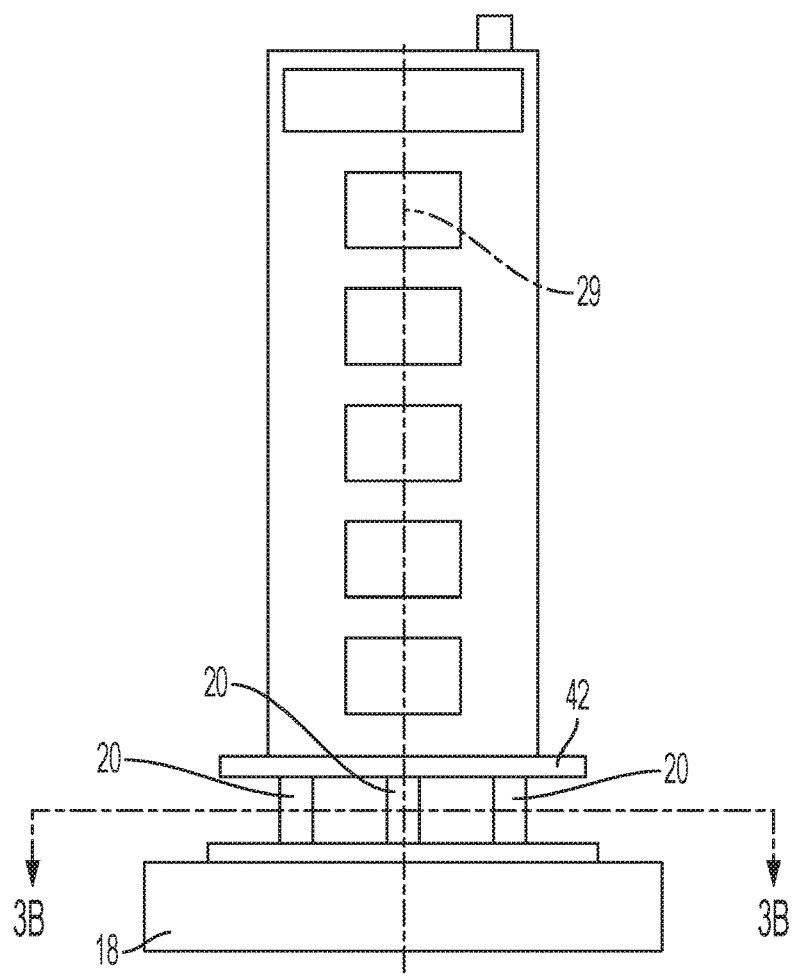
FIG. 8A illustrates a front view of the tamping device with a handle removed therefrom, and force sensors are attached to a frame of the tamping device and about a periphery of a head of the tamping device.
Figure 8B:
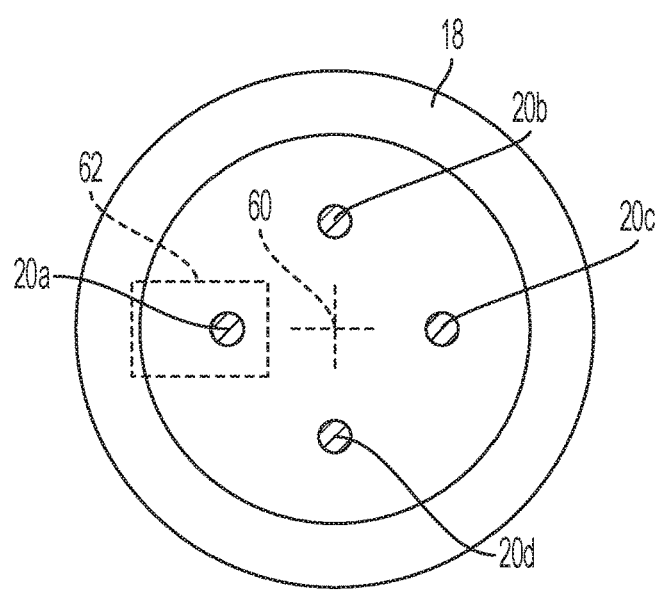
FIG. 8B is a top cross-sectional view of the head illustrating the force sensors positioned about the periphery of the head of the tamping device.

Referring now to FIGS. 8A and 8B, the head 18 of the tamping device 10 may connect to two or more force sensors 20. These force sensors 20 may be utilized to measure the degree to which the force applied to the ground coffee in the portafilter 14 is applied in an even manner.

As indicated previously, the user grips the handle 22 and presses the tamping device 10 into the basket of the portafilter 14. This step compresses the ground coffee in the basket of the portafilter. During this step, the ground coffee is preferably evenly distributed and compressed with a consistent pressure across the entire area of the basket.

To help with evenly pressing the ground coffee into the basket of the portafilter, the ground coffee may be filled into the basket evenly. The upper surface of the ground coffee may be leveled. For example, the user can gently hit the side of the basket after filling the basket with ground coffee to shake and even out the top surface of the ground coffee. Also, the head of the tamping device 10 may contact the basket of the portafilter. When the vibrator is on and vibrating, the head transmits vibration to the ground coffee and shakes the same to evenly distribute the ground coffee in the basket of the portafilter.

Thereafter, the user may insert the head 18 of the tamping device into the basket of the portafilter. As the user presses into the ground coffee, the four force sensors measure the amount of force about the periphery of the head 18. The four force sensors 20 may be connected to the frame 42 and the head 18. Each of the force sensors 20 provides a force reading. If the force sensor 20 on one side such as force sensor 20a has a higher force reading compared to a force sensor on the other side such as force sensor 20c, then this means that the user is not applying force evenly onto the top surface of the ground coffee. Rather, the user is pressing down on the ground coffee at a skewed angle. To mitigate the uneven density of ground coffee in the compressed ground coffee, the user can shift pressure to the other side near force sensor 20c so that the user is applying even pressure onto the top surface of the ground coffee.

To help the user know when he or she is applying uneven pressure, the tamping device 10 may have four lights, one light on each side of the handle. Each of the lights is associated with one of the force sensors. The color of the lights indicates where more or less pressure is being sensed by each of the four force sensors. For example, where more pressure is being sensed, the light may be illuminated red. Where less pressure is being sensed, the light may be illuminated yellow. Where two or more force sensors 20 senses about the same force, the light may be illuminated green.

Additionally or alternatively, an uneven force reading by the force sensors could mean that ground coffee was unevenly distributed in the basket. For example, more ground coffee may be located under an area 62 below the force sensor 20a compared to an area below force sensor 20c. The vibration from the vibrator applied to the ground coffee before pressing into the ground coffee or applying significant tamp force may help to mitigate uneven amounts of ground coffee throughout the basket.

Preferably, the force readings of the force sensors 20a-d can be within an allowable variance such as 50% of each other and more preferably within 25 or 15% within each other yet still be characterized as being equal to each other. As long as the sensed force readings of the force sensors are within the allowable variance, the tamping device may indicate that the pressure applied to the ground coffee is evenly distributed to the top surface of the ground coffee.

More particularly, the force sensors send its sensed force data to the processor. The processor determines when the pressure being applied by the head is uneven. When the force of one of the force sensors is greater than another one of the force sensors by an allowable variance, then the light associated with the force sensor which sensed a greater force may be illuminated red and the light associated with the force sensor which sensed a lesser force may be illuminated yellow. With the sensed force is within the allowable variance so that the sensed force is characterized as being equal to each other, then lights associated with those force sensors may be illuminated green. When the sum of the sensed forces of the force sensors equal the desired tamp force, the processor may activate the vibrator to notify the user that the desired tamp force has been achieved.

Figure 9:
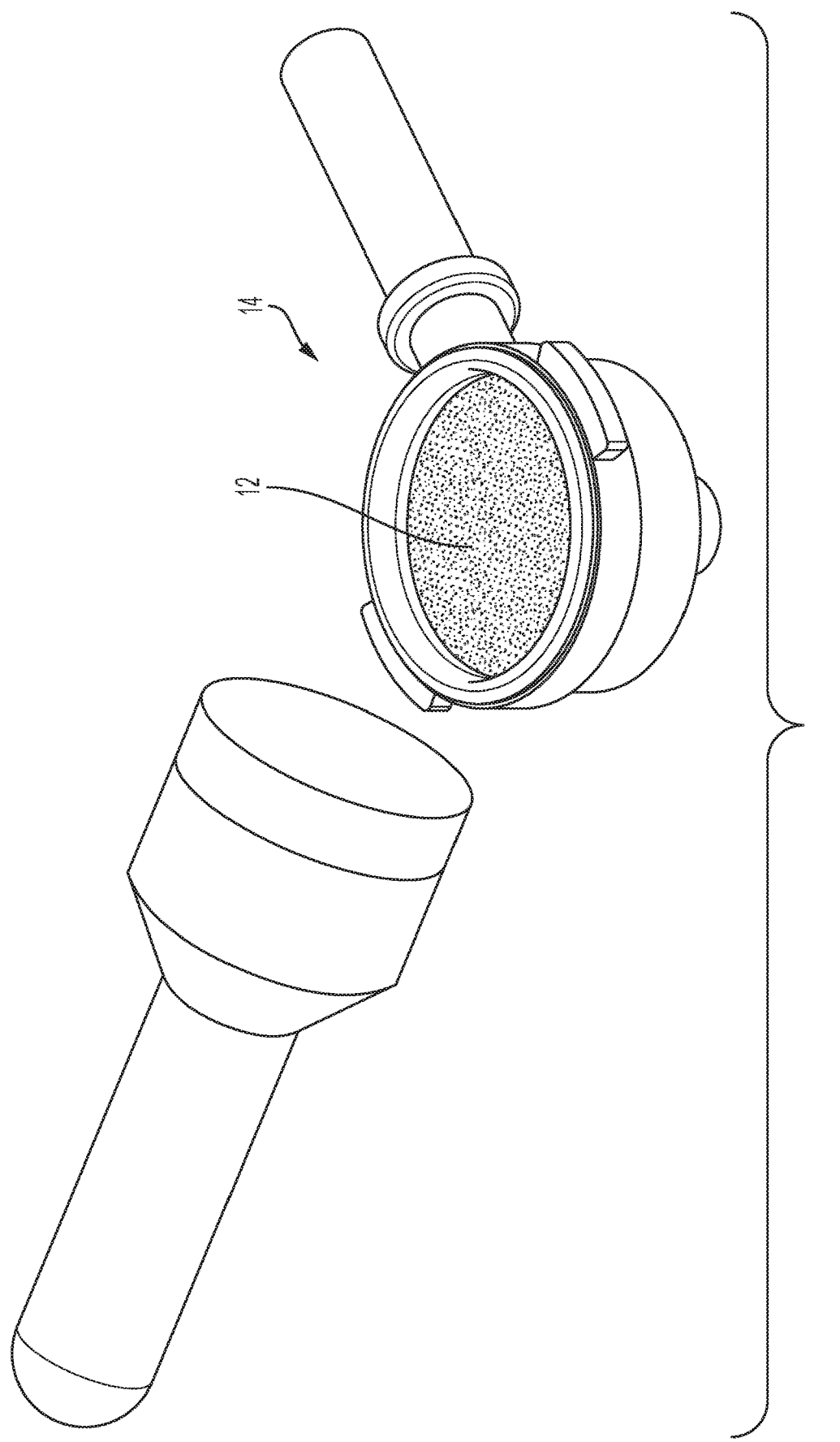
FIG. 9 illustrates a perspective view of the tamping device and portafilter with ground coffee leveled off below an edge of a basket of the portafilter.

During operation, the user may grind coffee beans and pour the ground coffee beans into the basket of the portafilter 14. The user may then scrape off the excess ground coffee so as to be level with the upper edge 62 of the portafilter 14 so that a consistent amount of ground coffee is distributed throughout the portafilter 14. Alternatively, a predetermined amount of ground coffee can be measured by weight, which is poured into the basket of the portafilter. This predetermined amount of ground coffee may not reach the upper edge of the basket of the portafilter. See FIG. 9. To level the ground coffee, the user may bump or tap the basket and/or contact the vibrating head of the tamping device to the basket of the portafilter. Moreover, the head of the tamping device may be placed into contact with the top surface of the ground coffee. The vibration of the head of the tamping device may shift the ground coffee to evenly spread the ground coffee in the basket of the portafilter and to help position each particulate of ground coffee to be more evenly adjacent to the adjacent particulates of ground coffee. Also, the head of the tamping device may be placed into contact with the top surface of the ground coffee in the basket while the head is vibrating. Such vibration transfers to the ground coffee and settles the ground coffee to more evenly distribute the ground coffee. By evenly distributing the ground coffee, this mitigates the formation of channels in the compressed ground coffee, which would brew espresso inconsistently.

Next, the user may enter one of the four modes of the tamping device 10. When the tamping device is initially turned on, the tamping device may default into mode one. The user may then select the desired mode either with the selector switch or through the display 40. The user then grips the handle 22 and presses the head 18 into the portafilter until the desired tamp force is achieved. The vibrator is used as a biofeedback mechanism to notify the user that the desired tamp force has been achieved. Thereafter, the user may then attach the portafilter 14 onto the group head of the espresso machine to brew the espresso.

Other means of notifying the user that the desired tamping force has been achieved are also contemplated. For example, the tamping device 10 may have an external light, which is illuminated when the desired tamping force is achieved. Because the vibrator may be on and vibrating throughout the entire tamping process, the head 18 of the tamping device may vibrate the ground coffee within the basket of the portafilter to evenly spread the ground coffee in the basket to mitigate channeling in the compressed ground coffee during the extraction process.

As discussed herein, to evenly distribute the ground coffee, before applying any significant force onto the ground coffee, the user may apply a light force against the upper edge 62 of the portafilter while the head of the tamping device is vibrating. The user may hold the head 18 against the basket or edge 62 of the basket for about one to 10 seconds. The vibration of the head 18 vibrates the basket of the portafilter through the edge 62. This vibration force is also applied to the ground coffee, which shakes and settles the ground coffee so that the ground coffee is evenly dispersed throughout the entire cavity of the basket of the portafilter filter 14 to mitigate channeling.

Thereafter, the user may apply force to the upper surface of the ground coffee 12 by pressing the head 18 against the upper surface of the ground coffee. The user may slowly increase the pressure to allow the vibration of the head 18 to further continue settling of the ground coffee within the basket of the portafilter. At the beginning while the pressure being applied to the top of the ground coffee is light (e.g., less than 5 lbs), the vibration from the head may settle the ground coffee to more evenly distribute the ground coffee in the basket of the portafilter.

The user continues to apply increasing amounts of force until the desired tamp force is sensed by the force sensor. As the applied force increases, the force sensors may sense different force levels. As long as the force levels are within an allowable variance to each other, the lights associated with the force sensors may indicate that an even amount of force is being applied to the ground coffee. When the sum of the forces from the force sensors indicate that the desired tamp force has been achieved, the vibrator may change its pattern to notify the user that the desired tamp force has been achieved.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A tamper for an espresso machine, the tamper comprising:
    a head having a disc shape and an engagement surface, the head having an outer diameter between 40 to 60 mm, the engagement surface being flat or convex;
    a handle attached to the head for manipulating the head to apply a tamp force to ground coffee disposed in a portafilter;
    a force sensor attached to the head to sense the tamp force applied to the ground coffee disposed in the portafilter;
    a vibrator attached to the head for transferring vibration from the head to the ground coffee; and
    a processor with instructions loaded thereon to perform the following steps:
        receiving a signal from the force sensor;
        activating the vibrator when the force sensor senses a first level of force based on a received signal from the force sensor; and
        deactivating the vibrator when the force sensor senses a second level of force based on the received signal from the force sensor.

2. A tamper for an espresso machine, the tamper comprising:
    a head having a disc shape and an engagement surface, the head having an outer diameter between 40 to 60 mm, the engagement surface being flat or convex;
    a handle attached to the head for manipulating the head to apply a tamp force to ground coffee disposed in a portafilter;
    a force sensor attached to the head to sense the tamp force applied to the ground coffee disposed in the portafilter;
    a vibrator attached to the head for transferring vibration from the head to the ground coffee; and
    a processor with instructions loaded thereon to perform the following steps:
        activating the vibrator; and
        changing a vibration intensity of the vibrator based on a received signal from the force sensor.

3. The tamper of claim 1 wherein the force sensor is a strain gage, a load cell, force-sensitive resistor, load pins, extensometers, torque sensors, piezoresistive-based force sensor, diaphragm pressure sensors or combinations thereof.

4. The tamper of claim 1 further comprising a plurality of force sensors, the force sensors positioned about a periphery of the head to measure evenness of the user applied force onto the ground coffee via the head.

5. The tamper of claim 1 further comprising first, second, third and fourth force sensors, each of the force sensors located 90 degrees apart from each other about a central axis of the head for measuring an evenness of the user applied force onto the ground coffee via the head.

6. The tamper of claim 2 wherein the force sensor is a strain gage, a load cell, force-sensitive resistor, load pins, extensometers, torque sensors, piezoresistive-based force sensor, diaphragm pressure sensors or combinations thereof.

7. The tamper of claim 2 further comprising a plurality of force sensors, the force sensors positioned about a periphery of the head to measure evenness of the user applied force onto the ground coffee via the head.

8. The tamper of claim 2 further comprising first, second, third and fourth force sensors, each of the force sensors located 90 degrees apart from each other about a central axis of the head for measuring an evenness of the user applied force onto the ground coffee via the head.

9. A method for using a tamper for preparing an espresso with an espresso machine, the method comprising the steps of:
   providing the tamper, the tamper having:
      a head having a disc shape and an engagement surface, the head having an outer diameter between 40 to 60 mm, the engagement surface being flat or convex;
      a handle attached to the head for manipulating the head to apply a tamp force to ground coffee disposed in a portafilter;
      a force sensor attached to the head to sense the tamp force applied to the ground coffee disposed in the portafilter;
      a vibrator attached to the head for transferring vibration from the head to the ground coffee; and
      a processor with instructions loaded thereon to perform the following steps:
         receiving a signal from the force sensor; and
         increasing or decreasing a vibration level vibrator when the force sensor senses a first level of force based on a received signal from the force sensor;
   disposing coffee grind into a basket of a portafilter;
   gripping the handle of the tamper;
   pressing the head of the tamper into coffee grind disposed in the basket of the portafilter; and
   increasing or decreasing pressure by hand based a change in vibration from the vibrator.

10. The method of claim 9 wherein the increasing or decreasing step comprising the step of decreasing pressure by hand when the vibrator reduces its vibration level.

* * * * *